May 19, 1970
G. HIRMANN
3,512,263
METHOD AND APPARATUS FOR THE AUTOMATIC DETERMINATION
OF THE GEOMETRIC WHEEL PLANE OF MOTOR VEHICLE WHEELS
Filed Sept. 28, 1967
2 Sheets-Sheet 1
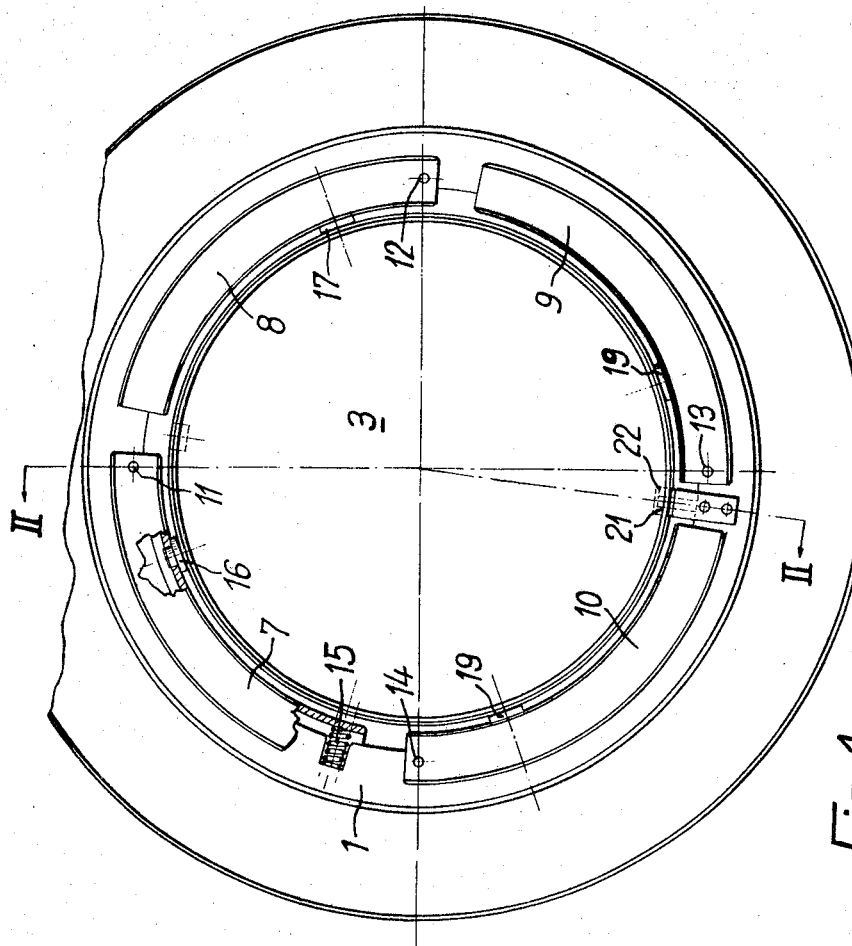
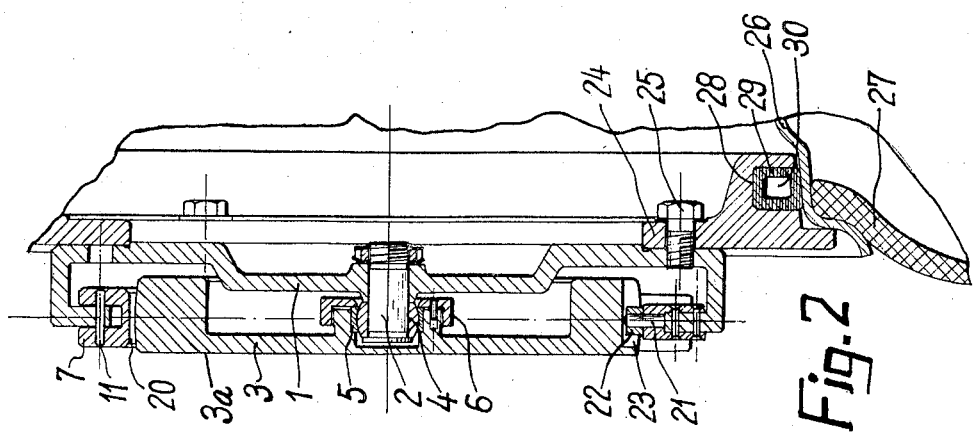
INVENTOR
G. Hirmann
BY Craig & Antonelli
ATTORNEYS

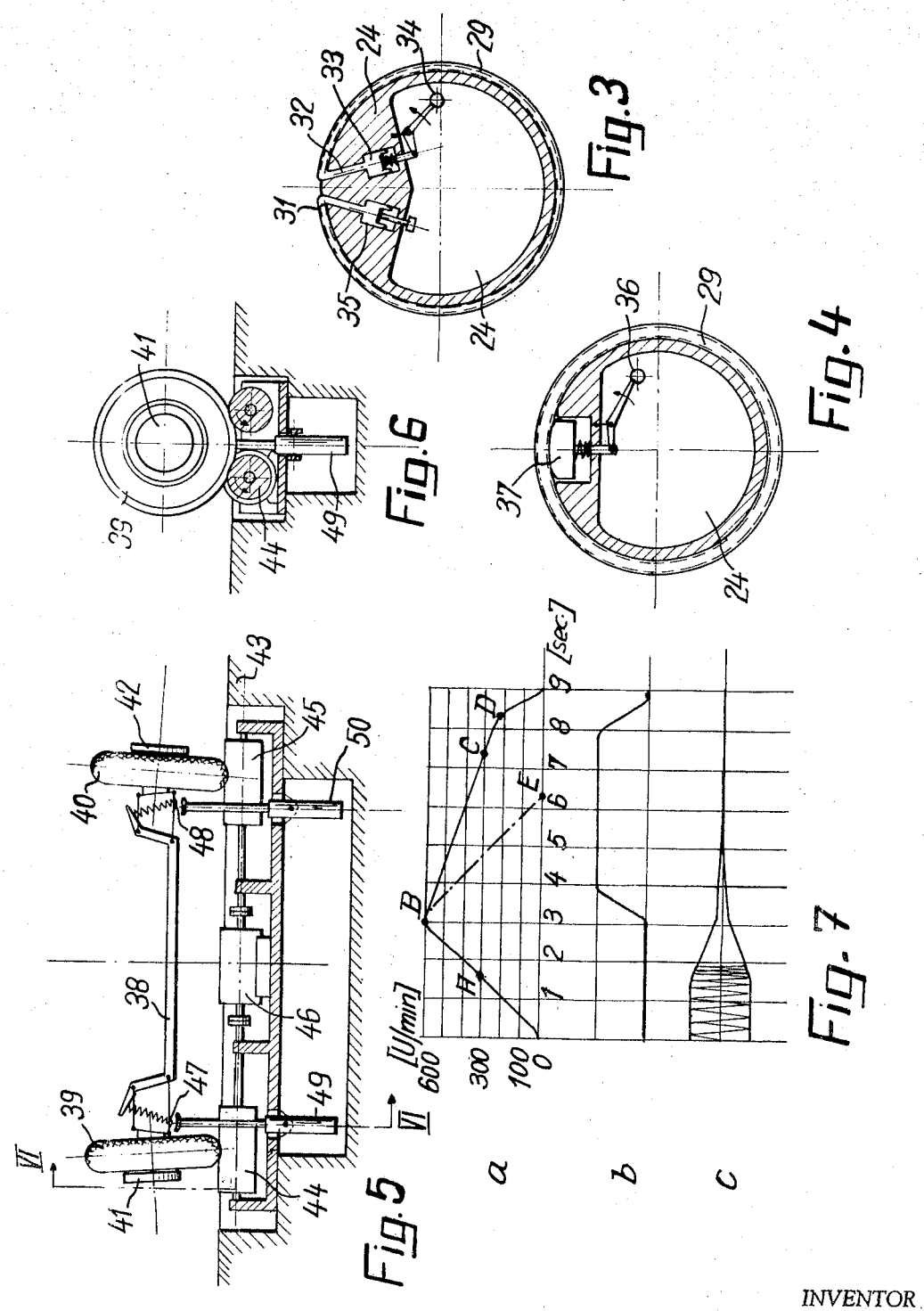

United States Patent Office
3,512,263
Patented May 19, 1970

3,512,263
METHOD AND APPARATUS FOR THE AUTOMATIC DETERMINATION OF THE GEOMETRIC WHEEL PLANE OF MOTOR VEHICLE WHEELS
Georg Hirmann, Zurich, Switzerland, assignor to Polyprodukte A.G., Zurich, Switzerland
Filed Sept. 28, 1967, Ser. No. 671,385
Claims priority, application Switzerland, Sept. 29, 1966, 14,105/66
Int. Cl. G01b 5/24
U.S. Cl. 33—203.13
17 Claims

ABSTRACT OF THE DISCLOSURE

A method and apparatus for automatically determining the geometric wheel plane of a motor vehicle wheel, which comprises an aligning device consisting of a carrier disk adapted to be clamped to a vehicle wheel, of an aligning disk pivotally secured to the carrier disk and of automatically disengageable clutch means for automatically releasing the aligning disk to enable its pivotal adjustment into the wheel plane at a predetermined rotational speed of the aligning device; the aligning device is clamped to a wheel which is thereupon rotated so that at a first predetermined speed the clutch releases the aligning disk which can thereupon begin to align itself to the wheel plane, the drive of the wheel is then discontinued at a second higher speed so that the wheel and the aligning device rotate, disconnected from the drive until the speed decreases to a point where the clutch reengages the aligning disk at a lower speed at which time the aligning disk has adjusted itself accurately to the wheel plane or a plane parallel thereto so that the aligning disk is thereafter retained in this position while the wheel and therewith the aligning device is brought to a standstill.

BACKGROUND OF THE INVENTION

The present invention is concerned with the control of the geometry of the running wheels of motor vehicles, and in particular with the measuring, for verifying purposes of the inclination of the wheels of a vehicle. The position of the vehicle wheels is determined by the toe-in and the camber of the wheels as well as by the angular position of the steering swivel pins. For this purpose, a number of methods and installations have already been disclosed in the prior art which, for the most part, utilize measuring devices that have to be secured at the wheel to be measured. The measuring devices used to this end are, for example, optical projecting instruments, mirrors, and measuring disks. However, it is necessary for an accurate measurement that the measuring device can be aligned in relation to a reference plane which is disposed accurately perpendicularly to the wheel axis and which is referred to as geometric wheel plane. The vehicle wheels or the rims thereof cannot serve as reference plane for purposes of an accurate measurement because tolerances are present already during the manufacture of the wheels and additionally deformations occur during use thereof. The main installations of the prior art utilize an aligning device fixed to the rim of the wheel which is adapted to be adjusted to the geometric wheel plane by an adjustment of set screws and by effecting repeated aligning operations relative to the fixed reference points.

SUMMARY OF THE INVENTION

The present invention has for its object the automatic adjustment of the aligning device to the geometric wheel plane. The present invention relates to a method and an apparatus for automatically ascertaining the geometric wheel plane for the purpose of checking the running gear or wheel geometry.

The method in accordance with the present invention is characterized by an aligning device adapted to be attached to the vehicle wheel, which is provided with a member pivotal toward opposite sides of the geometric wheel plane and with a coupling or clutch which retains the pivotal member in its position when the wheel is at standstill and releases the same when the wheel rotates under the effect of the centrifugal forces and which makes possible its pivotal movements into the geometric wheel plane by means of the centrifugal force.

Preferably the pivotal member is so constructed that it is provided with an outer or external face adapted to be adjusted into the geometric wheel plane. The inclination of the external face of the pivoting member may also serve as scanning surface for displaceable or slidably mounted scanning or sensing members of conventional construction. Such an installation is clearly disclosed in U.S. Pat. No. 3,417,479, issued on Dec. 24, 1968.

Appropriately, the position of the scanning or sensing members is converted by means of an electric measuring bridge into electric current values which may be recorded or indicated by way of an electric measuring instrument of any known conventional construction, as can be seen for example, again in U.S. Pat. No. 3,417,479.

It is also possible to secure on the pivotal member a measuring device, for example, a mirror or a projector.

An aligning installation serves as apparatus for carrying out the method of the present invention which comprises a stationary carrier disk secured at the vehicle wheel by means of a clamping mechanism and an alignment disk freely movable about a ball and socket joint, and in which a clutch is arranged between the carrier disk and the aligning disk which includes movable segments for disengaging the aligning disk during the rotation of the alignment installation.

There may be provided along the periphery of the carrier disk segments pivotal about pins which press brake shoes against the aligning disk under the pressure of springs.

The aligning disk is provided appropriately with an entrainment or follower member for engagement in the recess of the aligning disk without, however, preventing the latter from pivoting.

For example, a clamping mechanism may be combined with the carrier disk for the securing of the aligning installation at the vehicle wheel. An annular groove in the carrier disk may serve the purpose of receiving a hose or tube in which a pressure is produced by means of a gaseous or liquid medium for safely clamping the aligning installation at the vehicle wheel.

The pressure may be effected either by means of a pump or by a displacement device.

Accordingly, it is an object of the present invention to provide a method and apparatus for automatically ascertaining the geometric, dynamic wheel plane of motor vehicle wheels which eliminates by extremely simple means the aforementioned shortcomings and drawbacks encountered in the prior art.

Another object of the present invention resides in a method and apparatus for automatically determining the geometric wheel plane of rotating motor vehicle wheels which is simple in construction and easy to install as well as to operate.

A further object of the present invention resides in a method and apparatus for automatically determining the geometric wheel plane of wheels which operates completely automatically, thereby eliminating human errors.

Still a further object of the present invention resides in a method and apparatus for automatically ascertaining the geometric wheel plane of the type described above which is reliable in operation and is independent of inaccuracies in the wheel rim itself.

These and further objects, features, and advantages of the present invention will become more obvious from the following description when taken in connection with the accompanying drawing which shows, for purposes of illustration only, several embodiments in accordance with the present invention, and wherein:

FIG. 1 is a front elevational view of the aligning installation according to the present invention;

FIG. 2 is a cross-sectional view taken along line II—II of FIG. 1;

FIG. 3 is a cross-sectional view through a clamping device for the hydraulic actuation by means of a diaphragm pump;

FIG. 4 is a cross-sectional view, similar to FIG. 3, and illustrating a clamping device for hydraulic actuation by means of a displacement segment;

FIG. 5 is a cross-sectional view, through an alignment platform provided with a drive means for driving a pair of wheels to be measured in accordance with the present invention.

FIG. 6 is a cross-sectional view taken along line VI—VI of FIG. 5; and

FIG. 7 is a diagram illustrating the timed relationship of individual operations effected during the adjustment of an aligning installation in accordance with the present invention.

Referring now to the drawing wherein like reference numerals are used throughout the various views to designate like parts, and more particularly to FIGS. 1 and 2, the aligning device comprises a stationary member in the form of a carrier disk 1 having located therein a centrally secured pin or shaft 2 and an aligning disk 3 which is arranged so as to pivot about the shaft 2 by means of a ball-and-socket joint 4, 5. The inner bearing ring 4 is fixedly mounted on the shaft 2 whereas the outer bearing box 5 is secured to the aligning disk 3 by means of a cap screw or nut 6. A coupling or clutch, which consists of four segments 7, 8, 9 and 10, is located between the parts 1 and 3. The segments 7, 8, 9 and 10 are rotatably supported in the carrier disk 1 at one end by means of the pins 11, 12, 13 and 14, respectively. The other end of the segments 7, 8, 9 and 10 is pressed against the aligning disk 3 by pressure springs 15. Brake shoes 16, 17, 18 and 19 are provided at each of the segments 7, 8, 9 and 10 which, under the pressure of the springs 15, abut against the spherical shell surface 20 of the aligning disk 3 and therewith secure the position thereof with respect to the carrier disk 1. An inwardly directed entrainment or follower member 21 having a roller 22 is arranged at the periphery of the carrier disk 1 which engages in a recess or aperture 23 of the aligning disk 3.

The carrier disk 1 is connected at the rear thereof with a clamping device 24 by means of bolts 25. At its outer rim portion the clamping device 24 conforms to the shape of a rim 26 with tires 27 mounted thereon and is provided with an annular groove 28 into which is inserted a hose or inner tube 29. The hollow space 30 of the inner tube 29 may be adapted to accommodate a gaseous or liquid medium which in the clamped condition exerts a pressure against the wheel rim 26 and thereby rigidly connects the clamping device 24 together with the aligning installation with the vehicle wheel.

The clamping device 24 may be so constructed according to FIG. 3 that the inner tube 29 is extended inwardly with its ends 31 and 32 and carries at one of the ends a diaphragm pump 33 which is actuated by means of a lever 34. The other end of the inner tube 29 contains an adjusting cylinder 35 for the adjustment of the clamping range. The filling of the inner tube may also take place from the outside by means of a fill-up valve.

FIG. 4 illustrates a further embodiment of the clamping device 24 in accordance with the present invention in which the inner tube 29 receiving the liquid medium is closed in an endless manner. A pressure is exerted on the inner tube 29 by means of a displacement segment 37 actuated by the lever 36. As a result of this pressure, the inner tube 29 is evenly inflated outwardly and thereby causes the clamping device to be securely clamped and retained in position on the vehicle wheel.

An alignment platform for the series examination of running gears or vehicle wheels is shown by way of example in FIGS. 5 and 6. Two vehicle wheels 39 and 40 with aligning devices 41 and 42 attached thereto are mounted on the front wheel axle 38 of the suspension. The wheels 39 and 40 run on rollers 44 and 45 recessed in the floor 43, which are driven from a motor 46. Hydraulic working cylinders 49 and 50, which permit a lifting of the wheels and therewith a separation thereof from the driven rollers 44 and 45, are disposed underneath the steering knuckles 47 and 48 of the wheels 39 and 40, respectively.

FIG. 7 illustrates three diagrams a, b, and c along the horizontal axes or abscissae of which is indicated the time in seconds. With respect to the diagram a, the vertical axis or ordinate represents the number of revolutions per minute of the driven wheel, and with respect to the diagram b, the vertical axis or ordinate represents the lifting of the wheels of the vehicle by the working cylinders whereas with respect to the diagram c, the vertical axis or ordinate represents the amplitude of the oscillations of the not-yet-adjusted aligning disks.

The wheels 39 and 40, resting on the rollers 44 and 45 of the measuring platform as shown in FIGS. 5 and 6 are taken along by friction after starting the motor 46 whereby the rotational speed thereof gradually increases. The aligning installations 41 and 42 rotate together with the wheels 39 and 40, and the aligning disks 3 of the aligning installations 41 and 42 are automatically disengaged at a rotational speed of about 300 r.p.m. by reason of the centrifugal effect (point A in diagram a). At this rotational speed, the centrifugal force acting on the clutch segments 7, 8, 9 and 10 (FIG. 1) overcomes the pressure of the springs 15 and enables the aligning disks 3 to perform a free pivoting about the respective ball and socket joints 4, 5. The aligning disks 3 are displaced or pivoted by the centrifugal force approximately into the geometric wheel plane. The drive thereof is assured also after disengagement of the clutch since they continue to be operatively connected with the carrier disks 1 by way of the entrainment or follower member 21 (FIG. 1).

The rotational speed of the aligning disks 3 now further increases to approximately 600 revolutions per minute (point B). At this time, the working cylinders 49 and 50 start to operate by any conventional means and are effective to lift the vehicle wheels from the corresponding driving rollers. This operation can be recognized from the diagram b. Upon disconnection of the drive from the wheels, the amplitudes of oscillations are further decreased (see diagram c).

The rotational speed of the freely running vehicle wheels 39 and 40 as also the rotational speed of the aligning disks now decreases. Since the aligning disks are freed from the interfering oscillations or vibrations of the drive, they are able to adjust themselves accurately to the geometrical wheel plane. As soon as the rotational speed has slowed down again to about 300 revolutions per minute (point C), the clutch segments again are closed or reengaged and thereby lock the aligning disks in the accurate geometrical wheel plane or in a plane parallel thereto. After the rotational speed has further decreased to about 200 revolutions per minute (point D), a lowering of the working cylinders 49 and 50 occurs by any conventional means and the vehicle wheels are again placed on the driving rollers 44 and 45 which had been stopped in the meantime. The latter had already come to a standstill at the point E of the dash and dot line in diagram a. As a result thereof, the rotational speed of the wheels and of the aligning installations drops quickly to zero. The entire operation lasts about 9 seconds which is followed either by the measurement proper of the angle of inclination of the vehicle wheels, or by moving the vehicle to a measuring platform for proceeding with the measurement of the angles.

Various possibilities exist for measuring the angular inclinations at the wheels of the vehicle. In the arrangement of the present invention, the outer faces 3a of the aligning disks 3 are secured or scanned by sensing or scanning members of conventional construction as disclosed, for example, in U.S. Pat. No. 3,417,479. The values obtained by these sensing devices or scanning members are translated by means of a conventional electrical measuring bridge into current characteristics and are indicated by an electrical measuring instrument, again of any known type or construction. However, the apparatus of the present invention is applicable also with other measuring methods insofar as they make use either directly or indirectly of a reference plane corresponding to the geometric wheel plane. Since the various sensing, scanning, bridge and indicating devices are known per se in the art and form no part of the present invention, a detailed description thereof is dispensed with herein.

While I have shown and described several embodiments in accordance with the present invention, it is understood that the same is not limited thereto but is susceptible of numerous changes and modifications as known to a person skilled in the art, and I therefore do not wish to be limited to the details shown and described herein.

I claim:

1. A method for the automatic determination of the geometric wheel plane for purposes of controlling the geometry of the running wheel, comprising the steps of fastening to the vehicle wheel an aligning device with a part adapted to pivot toward either side of the geometric wheel plane, holding the pivotal part in its position during the standstill of the wheel, setting into rotation the aligning device by rotating the respective wheel, releasing the pivotal part under the effect of centrifugal force upon rotation of the wheel at a first relational speed of the aligning device, discontinuing the drive of the respective wheel at a second rotational speed which is higher than the first rotational speed, permitting the pivotal member to adjust itself automatically into the wheel plane while the respective wheel, which is no longer driven, decreases in its rotational speed, reengaging the pivotal part to hold it in position in relation to the aligning device at about the first speed, and thereafter braking the rotational speed of the aligning device until it comes to a standstill.

2. An apparatus for automatically determining the geometric wheel plane of a motor vehicle wheel, comprising aligning means adapted to be secured at a vehicle wheel including pivotal means operatively connected with the aligning means and adapted to pivot toward both sides of the geometric wheel plane from a standstill position, and engageable means associated with the aligning means for retaining the pivotal means in its position during standstill of the wheel while automatically releasing the pivotal means under the influence of the centrifugal force with a rotating wheel and enabling pivoting movement thereof into the geometric wheel plane by means of the centrifugal force.

3. An apparatus according to claim 2, wherein said pivotal means includes an external face adjustable into the geometric wheel plane.

4. An apparatus according to claim 2, wherein said aligning means includes a carrier disk, clamping means for clamping said carrier disk at the vehicle wheel, said pivotal means including an aligning disk, joint means between said two disks to enable free pivotal movement of the aligning disk relative to the carrier disk, and engageable means between said disks for disengaging the aligning disk during rotation of the aligning means.

5. An apparatus according to claim 4, wherein said engaging means is a clutch including movable segments.

6. An apparatus according to claim 4, wherein said carrier disk includes entrainment means form-lockingly engaging in the aligning disk in such a manner as not to impair the pivotal movement thereof.

7. An apparatus according to claim 4, wherein the clamping means is provided at the carrier disk for securing the aligning means at the vehicle wheel.

8. An apparatus according to claim 9, wherein the carrier disk is provided with an annular groove for the accommodation of a tube in which a pressure is provided by a fluid medium for clamping the aligning means at the vehicle wheel.

9. An apparatus according to claim 4, wherein said engageable means includes pivotal segments provided along the periphery of the carrier disk which are pivotal about shafts, brake shoe means under the pressure of spring means, said segments pressing said brake shoe means against the aligning disk.

10. An apparatus according to claim 9, wherein said carrier disk includes entrainment means form-lockingly engaging in the aligning disk in such a manner as not to impair the pivotal movement thereof.

11. An apparatus according to claim 10, wherein said clamping means is provided at the carrier disk for securing the aligning means at the vehicle wheel.

12. An apparatus according to claim 10, wherein the carrier disk is provided with an annular groove for the accommodation of a tube in which a pressure is provided by a fluid medium for clamping the aligning means at the vehicle wheel.

13. An apparatus according to claim 12, further comprising diaphragm pump means for producing the pressure within said tube.

14. An apparatus according to claim 12, further comprising displacement means for effecting the pressure within said tube.

15. An apparatus according to claim 8, further comprising diaphragm pump means for producing the pressure within said tube.

16. An apparatus according to claim 8, further comprising displacement means for effecting the pressure within said tube.

17. An apparatus according to claim 8, wherein said carrier disk includes entrainment means form-lockingly engaging in the aligning disk in such a manner as not to impair the pivotal movement thereof.

References Cited

UNITED STATES PATENTS

| | | | |
|---|---|---|---|
| 1,754,252 | 4/1930 | Altorfer | 74—573 |
| 2,442,397 | 6/1948 | Candor | 74—573 |
| 2,700,892 | 2/1955 | Lowe | 33—203.13 X |
| 2,882,607 | 4/1959 | Binder | 33—203 |
| 2,895,766 | 7/1959 | Leopold | 301—5 |

WILLIAM D. MARTIN, Jr., Primary Examiner

U.S. Cl. X.R.

33—203.13; 301—5